(12) United States Patent
Feigel et al.

(10) Patent No.: US 10,131,333 B2
(45) Date of Patent: Nov. 20, 2018

(54) BRAKE ACTUATION UNIT

(71) Applicant: Continental Teves AG & Co. oHG, Frankfurt (DE)

(72) Inventors: Hans-Jörg Feigel, Rosbach (DE); Josko Kurbasa, Waldsolms (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 67 days.

(21) Appl. No.: 14/772,684

(22) PCT Filed: Feb. 28, 2014

(86) PCT No.: PCT/EP2014/053893
§ 371 (c)(1),
(2) Date: Sep. 3, 2015

(87) PCT Pub. No.: WO2014/135446
PCT Pub. Date: Sep. 12, 2014

(65) Prior Publication Data
US 2016/0009263 A1    Jan. 14, 2016

(30) Foreign Application Priority Data

Mar. 5, 2013   (DE) .......................... 10 2013 203 755
Dec. 4, 2013   (DE) .......................... 10 2013 224 870

(51) Int. Cl.
*B60T 8/40*    (2006.01)
*B60T 11/224*  (2006.01)
(Continued)

(52) U.S. Cl.
CPC ............ *B60T 8/4081* (2013.01); *B60T 7/042* (2013.01); *B60T 7/12* (2013.01); *B60T 8/171* (2013.01);
(Continued)

(58) Field of Classification Search
CPC ........ B60T 8/4081; B60T 8/321; B60T 8/171; B60T 7/042; B60T 7/12; B60T 11/103; B60T 11/224; B60T 2270/82
See application file for complete search history.

(56) References Cited

U.S. PATENT DOCUMENTS 5,215,359 A * 6/1993 Burgdorf .............. B60T 8/4054
303/115.4
7,163,088 B2 * 1/2007 Jahns ..................... B60L 11/18
180/210
(Continued)

FOREIGN PATENT DOCUMENTS

DE   10 2011 017 436 A1   10/2012
DE   10 2012 205 859 A1   10/2012
(Continued)

OTHER PUBLICATIONS

English Machine Translation of DE-102011122776.*
PCT International Search Report—dated Sep. 23, 2014.
German Examination Report—dated Dec. 2, 2014.

*Primary Examiner* — Melody M Burch
(74) *Attorney, Agent, or Firm* — Brinks Gilson & Lione

(57) ABSTRACT

A brake actuation unit (1) having a master brake cylinder (2) and a pressure-medium reservoir (4); a pressure provision device (5), having a piston (51) actuated by an electric motor (35), wherein the piston delimits a pressure chamber (50); first and second groups of electrically actuatable valves (6a-6d, 7a-7d); and an electronic control unit (12, 12'). The electric motor has at least two independently operable drive units, each having at least one winding, for driving the electric motor. The electronic control unit has a first microcontroller (201) and a second microcontroller (301). The first microcontroller controls (205) one of the drive units and the second microcontroller controls (305) the other of the (Continued)

drive units. The first and second microcontrollers control (207, 307) the second group of valves.

14 Claims, 5 Drawing Sheets

(51) Int. Cl.
    *B60T 8/32*     (2006.01)
    *B60T 7/04*     (2006.01)
    *B60T 7/12*     (2006.01)
    *B60T 8/171*     (2006.01)
    *B60T 11/10*     (2006.01)

(52) U.S. Cl.
    CPC .............. *B60T 8/321* (2013.01); *B60T 11/103* (2013.01); *B60T 11/224* (2013.01); *B60T 2270/82* (2013.01)

(56) References Cited

U.S. PATENT DOCUMENTS

2002/0117891 A1*   8/2002   Harris ..................... B60T 7/042
    303/20
2011/0156626 A1*   6/2011   Mukai .................. B62D 5/0487
    318/400.21

FOREIGN PATENT DOCUMENTS

| | | |
|---|---|---|
| DE | 10 2011 006 310 A1 | 12/2012 |
| DE | 10 2011 122 776 A1 | 1/2013 |
| DE | 10 2012 210 809 A1 | 1/2013 |
| WO | WO 2013/023953 A1 | 2/2013 |

\* cited by examiner

Fig. 1

BRAKE ACTUATION UNIT

CROSS REFERENCE TO RELATED APPLICATIONS

This application claims priority to German Patent Application Nos. 10 2013 203 755.4, filed Mar. 5, 2013; 10 2013 224 870.9, filed Dec. 4, 2013; and PCT/EP2014/053893, filed Feb. 28, 2014.

FIELD OF THE INVENTION

The invention relates to a brake actuation unit for a brake-by-wire motor vehicle brake system.

BACKGROUND

In motor vehicle engineering, brake-by-wire brake systems are becoming ever more widespread. Such brake systems often include not only a master brake cylinder which can be actuated by the vehicle driver but also an electrically controllable pressure supply device by means of which the wheel brakes are actuated in the brake-by-wire operating mode.

International patent application WO 2013/023953 A1 discloses a brake actuation unit for a brake-by-wire motor vehicle brake system. In this context, arranged in the unit are a brake-pedal actuatable master brake cylinder to which the wheel brakes of the motor vehicle can be connected, an electrically controllable pressure supply device which is embodied as a hydraulic cylinder-piston arrangement whose piston can be moved by an electric motor by means of a rotation-translation gear mechanism, a brake pedal sensation simulator, a valve arrangement and an electronic open-loop and closed-loop control unit (referred to as a one-box design). The wheel brakes are supplied with pressure by the pressure supply device in a brake-by-wire operating mode. A pressure buildup by the pressure supply device is no longer possible even in the case of a single fault in the region of the pressure supply device, in particular a leak in the seal of the pressure space of the pressure supply device or a fault in the electrical activation of the electric motor of the pressure supply device, and the wheel brakes can then only be supplied with pressure by the vehicle driver by means of the master brake cylinder. Owing to this restricted availability of the brake actuation unit, such an actuation unit is therefore not suitable for partially autonomous or autonomous driving.

The object of the present invention is to make available a brake system with which the safety requirements of partially autonomous or autonomous driving are satisfied. In this context, for reasons of costs and installation space, an integrated brake actuation unit (one-box design) with only one electrically activatable pressure supply device and only one electronic open-loop and closed-loop control unit for activating the brake actuation unit is to be adhered to, in particular the pressure supply device and the valve arrangement are to be adhered to.

This object is achieved according to the invention by means of a brake actuation unit as described herein.

SUMMARY AND INTRODUCTORY DESCRIPTION

The present invention is based on the concept that after a predefined actuation of the piston, the pressure space of the pressure supply device is sealed by an additional sealing element. The electric motor has at least two drive units which can be operated independently of one another and each have at least one winding for driving the rotor of the electric motor, and the electronic open-loop and closed-loop control unit includes a first microcontroller and a second microcontroller, wherein the first microcontroller is designed to activate one of the drive units of the electric motor, and the second microcontroller is designed to activate the other of the drive units of the electric motor. The first and second microcontrollers are designed to activate the second group of valves which are provided for disconnecting or connecting the wheel brakes from or to the master brake cylinder or from or to the pressure supply device. In this way, each of the microcontrollers can carry out braking by means of the pressure supply device in the brake-by-wire operating mode independently of the other microcontroller.

The additional sealing element is preferably without a sealing effect if the piston is in an unactuated state.

The pressure space is preferably sealed by the main sealing element in the unactuated state of the piston.

The additional sealing element preferably has a sealing effect after a predefined actuation of the first piston.

One of the drive units can preferably be activated only by the first microcontroller, and the other drive unit only by the second microcontroller.

The invention provides the advantage that the individual faults which occur with relevant probability in the region of the pressure supply device or the activation thereof does not bring about a failure of the pressure supply device. The inventive combination of the features permits the availability of the brake actuation device for an autonomous braking function to be increased to sufficient values, without costly further components such as, for example, a further electrically activatable pressure supply device having to be used.

The brake actuation unit preferably includes a pedal travel simulator which gives the vehicle driver a pleasant brake pedal sensation in a brake-by-wire operating mode. The pedal travel simulator is advantageously embodied so as to be capable of being switched on and off by means of a simulator enabling valve. The simulator enabling valve can be activated by the first microcontroller and by the second microcontroller. The pedal travel simulator is particularly preferably embodied in a hydraulic fashion and is or can be connected to the pressure space of the master brake cylinder.

According to one preferred embodiment of the invention, the pressure supply device includes a stepped bore arranged in a housing, and the piston of the pressure supply device is embodied as a stepped piston whose piston step with a smaller diameter dips into the step with a smaller diameter of the stepped bore after predefined actuation of the stepped piston, with the result that the pressure space is divided into a first pressure space area at which the pressure medium connection is arranged, and a second pressure space area, advantageously an annular chamber.

In the dipped-in state of the piston step the first pressure space area and the second pressure space area are preferably sealed with respect to one another by the additional sealing element.

The second pressure space area can preferably be connected to the pressure medium reservoir vessel via a hydraulic valve.

The additional sealing element is preferably attached in the housing in the region of the bore step with a smaller diameter.

Alternatively, it is preferred that the additional sealing element is attached to the stepped piston in the region of the piston step with a smaller diameter.

The first group of valves preferably includes an inlet valve and an outlet valve per wheel brake.

According to one preferred embodiment of the inventive brake actuation unit, the first group of valves can be activated only by the first microcontroller. Nevertheless, normal braking is possible in the case of braking in the brake-by-wire operating mode which is controlled by the second microcontroller. Traction control functions or vehicle movement dynamics control functions (such as functions of the anti-lock brake system (ABS), the ESC (electronic stability control) etc.) can be carried out without restriction in the brake-by-wire operating mode in the case of braking which is controlled by the first microcontroller.

Alternatively it is preferred that the valves of the first group assigned to the rear wheel brakes can be additionally activated by the second microcontroller. In this way, an electronic braking force distribution (EPD) can be carried out even in the case of braking which is controlled by the second microcontroller in the brake-by-wire operating mode.

The brake actuation unit preferably includes an electrically actuatable diagnostic valve which is arranged in a hydraulic connection between the master brake cylinder pressure space and the pressure medium reservoir vessel. The diagnostic valve can be activated by at least the first microcontroller.

According to one development of the invention, the brake actuation unit is configured to activate at least one electrically actuatable parking brake actuator on at least one of the wheel brakes in order to be able to carry out service braking by means of the parking brake actuator in an emergency. The parking brake actuator or actuators can preferably be activated only by the second microcontroller for the purpose of service braking. The electrically actuatable parking brake actuators which are arranged on the wheel brakes of the rear axle of the motor vehicle can advantageously be activated by the second microcontroller.

The wheel brakes are preferably arranged in two brake circuits. The second group of valves which can be activated by the first and second microcontrollers preferably includes at least one isolating valve per brake circuit for disconnecting the master brake cylinder from the wheel brakes of the brake circuit, and a sequence valve per brake circuit for disconnecting the pressure supply device from the wheel brakes of the brake circuit.

The simulator enabling valve preferably also belongs to the second group of valves which can be actuated by the first microcontroller and the second microcontroller.

Each brake circuit is preferably connected to the master brake cylinder via a hydraulic connecting line having an isolating valve which is advantageously open in the currentless state (normally open or NO), and to the pressure supply device via a further hydraulic connecting line having a sequence valve which is advantageously closed in the currentless state (normally closed or NC).

According to one preferred embodiment of the invention, the open-loop and closed-loop control unit includes a first and a second electrical connecting element, wherein the open-loop and closed-loop control unit can be supplied with electrical energy from at least a first electrical energy supply device via the first connecting element, and from at least a second electrical energy supply device via the second connecting element.

For a cost-effective energy supply of the brake actuation unit, the first connecting element can particularly preferably be supplied with electrical energy only by the first energy supply device, and the second connecting element only by the second energy supply device.

Increased safety in the supply with electrical energy is ensured in that the first and the second electrical connecting elements can particularly preferably each be supplied optionally with electrical energy by the first and the second energy supply devices.

According to one development of the invention, the brake actuation unit includes, for detecting the driver's braking request, a first pressure sensor for detecting a pressure of the master brake cylinder and a second pressure sensor for detecting a pressure of the pressure supply device, wherein the signals of the first pressure sensor are fed only to the first microcontroller and the signals of the second pressure sensor are fed only to the second microcontroller. In order to increase the availability of a pressure signal, one of the pressure sensors or both pressure sensors is/are particularly preferably embodied redundantly.

Furthermore, the brake actuation unit preferably includes a redundantly embodied travel sensor or two independent travel sensors for detecting a position of the brake pedal or of a master brake cylinder piston. In each case a signal of the redundant travel sensor is advantageously fed to the first microcontroller and to the second microcontroller. In the case of two travel sensors, the signal of the one travel sensor is fed to the first microcontroller, and the signal of the other travel sensor is fed to the second microcontroller.

According to one development of the invention, the brake actuation unit includes, for communication with other control units of the motor vehicle, a first bus connection for a first databus and a second bus connection for a second databus, wherein the first bus connection is connected only to the first microcontroller, and the second bus connection is connected only to the second microcontroller. Furthermore, the first and second microcontrollers are connected to one another via a third databus. Even in the event of a failure of one of the databuses, information can therefore be transmitted to both microcontrollers.

In order to increase the availability, for example in the event of one of the connecting elements of the brake actuation unit not being correctly connected, the first bus connection and the second bus connection are arranged at different electrical connecting elements of the brake actuation unit.

The invention preferably concerns a brake system for motor vehicles which is operated in what is referred to as a brake-by-wire operating mode both by the vehicle driver and independently of the vehicle driver, is preferably operated in the brake-by-wire operating mode and can be operated in at least one fallback operating mode in which only operation by the vehicle driver is possible.

Further preferred embodiments of the invention can be found in the following description with reference to figures.

BRIEF DESCRIPTION OF THE DRAWINGS

FIG. 1 shows a highly schematically illustrated first exemplary embodiment of a brake actuation unit according to the invention.

FURTHER DESCRIPTION OF THE INVENTION

Figure 1:
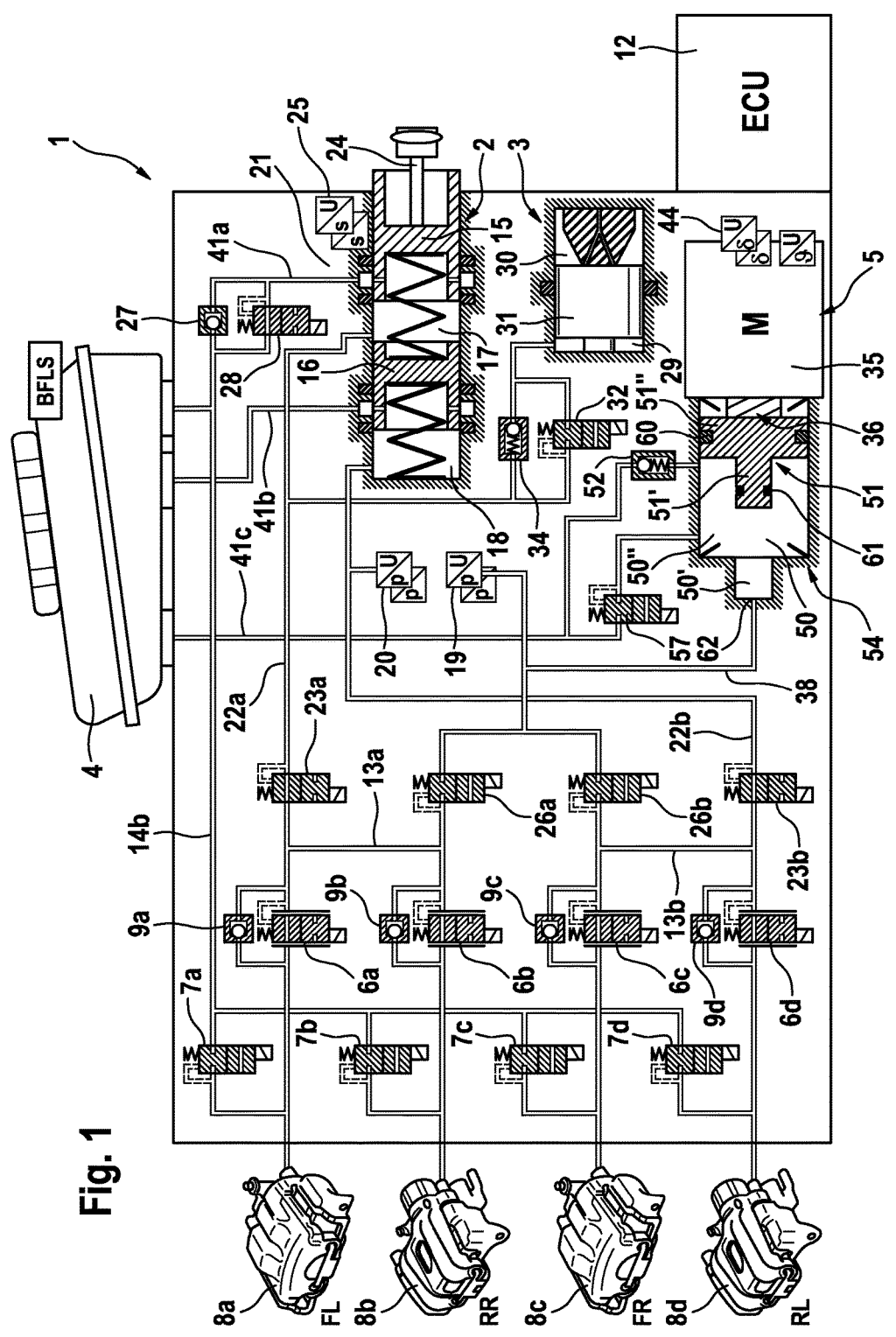
Figure 2:
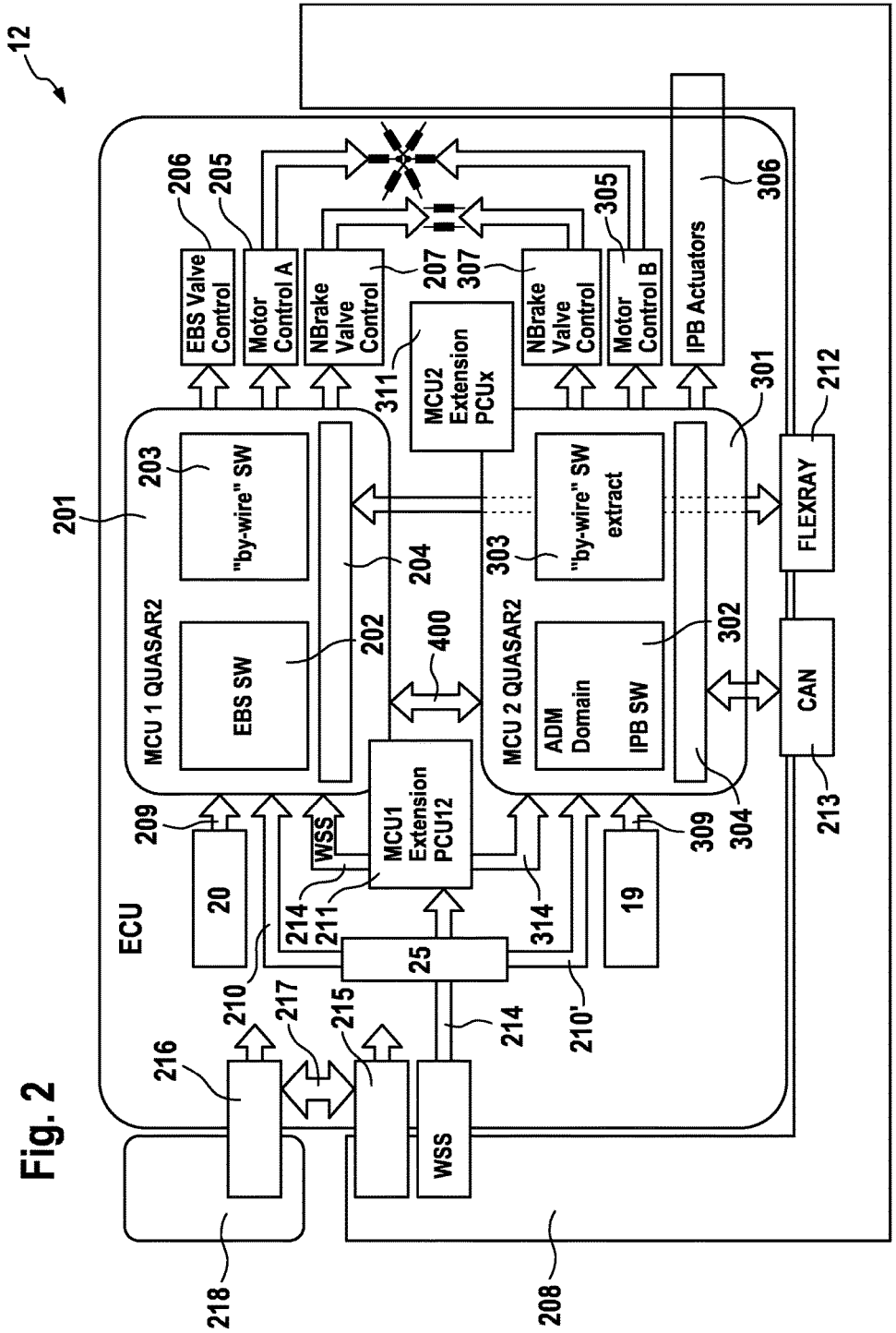
FIG. 2 shows a first exemplary open-loop and closed-loop control unit of a brake actuation unit according to the invention.

FIG. 1 is a highly schematic illustration of a brake system for motor vehicles with a first exemplary embodiment of a brake actuation unit according to the invention. The illustrated brake system includes the exemplary brake actuation unit 1 and hydraulically actuatable wheel brakes 8a-8d which are connected to the brake actuation unit.

The brake actuation unit 1 includes essentially a master brake cylinder 2 which can be actuated by means of an actuation pedal or brake pedal (not illustrated), a pedal travel simulator (simulation device) 3 which interacts with the master brake cylinder 2, a pressure medium reservoir vessel 4 which is assigned to the master brake cylinder 2 and the retained pressure medium is exposed to atmospheric pressure, an electrically controllable pressure supply device 5, a first group of electrically actuatable valves 6a-6d, 7a-7d (also referred to as inlet valves and outlet valves respectively) for setting wheel-specific brake pressures, a second group of electrically actuatable valves 23a, 23b, 26a, 26b for disconnecting or connecting the wheel brakes 8a-8d from or to the master brake cylinder 2 or from or to the pressure supply device 5, and an electronic open-loop and closed-loop control unit 12.

The first group of valves includes, for example, per wheel brake 8a-8d of the motor vehicle (not illustrated) an inlet valve 6a-6d and an outlet valve 7a-7d which are connected together in pairs hydraulically by means of center connections and are connected to the wheel brakes 8a-8d. The input connections of the inlet valves 6a-6d are supplied with pressures by means of brake circuit supply lines 13a, 13b, said pressures being derived from a brake system pressure in a brake-by-wire operating mode, which brake system pressure is present in a system pressure line 38 which is connected to a pressure space 50 of the electrically controllable pressure supply device 5. A nonreturn valve 9a-9d which opens toward the brake circuit supply lines 13a, 13b is connected in each case in parallel with each of the inlet valves 6a-6d. In a fallback operating mode, the brake circuit supply lines 13a-13d are supplied, via hydraulic lines 22a, 22b, with the pressures of the pressure spaces 17, 18 of the master brake cylinder 2. The output connections of the outlet valves 7a-7d are connected to the pressure medium reservoir vessel 4 via a nonreturn line 14b.

The master brake cylinder 2 has, in a housing 21, two pistons 15, 16 which are arranged one beyond the other and which bound pressure spaces 17, 18 which form, together with the pistons 15, 16, a dual-circuit master brake cylinder or a tandem master brake cylinder. The pressure spaces 17, 18 are connected, on the one hand, to the pressure medium reservoir vessel 4 via, on the one hand, radial bores formed in the pistons 15, 16 and via corresponding pressure equalization lines 41a, 41b, wherein the latter can be shut off by a relative movement of the pistons 17, 18 in the housing 21, and, on the other hand, are connected to the brake circuit supply lines 13a, 13b (already mentioned) by means of the hydraulic lines 22a, 22b, via which brake circuit supply lines 13a, 13b the inlet valves 6a-6d are connected to the master brake cylinder 2. In this context, the pressure equalization line 41a contains a parallel connection of a diagnostic valve 28, which is normally open (NO valve), to a nonreturn valve 27 which closes toward the pressure medium reservoir vessel 4. The pressure spaces 17, 18 hold resetting springs (not indicated in more detail) which position the pistons 15, 16 in a home position when the master brake cylinder 2 is not actuated. A piston rod 24 couples the pivoting movement of the brake pedal owing to a pedal actuation to the translation movement of the first (master cylinder) piston 15, the actuation travel of which is sensed by a preferably redundantly embodied pressure sensor 25. As a result, the corresponding piston travel signal is a measure of the brake pedal actuation angle. It represents a braking request of a vehicle driver.

Arranged in each of the line sections 22a, 22b connected to the pressure spaces 17, 18 is an isolating valve 23a, 23b which is embodied in each case as an electrically actuatable valve which is preferably open in the currentless state (NO valve). The hydraulic connection between the pressure spaces 17, 18 and the brake circuit supply lines 13a, 13b can be shut off by means of the isolating valves 23a, 23b. A pressure sensor 20 which is connected to the line section 22b detects the pressure built up in the master brake cylinder 2.

According to the exemplary embodiment, the wheel brakes 8a and 8b are assigned to the left-hand front wheel (LF) and to the right-hand rear wheel (RR) and are connected to the first brake circuit I (13a). The wheel brakes 8c and 8d are connected to the right-hand front wheel (RF) and to the left-hand rear wheel (LR) and connected to the second brake circuit II (13b).

For example, the brake system (not illustrated in FIG. 1) includes, at least at the wheel brakes 8b, 8d of the rear wheels RR and LR, in each case an electrically actuatable parking brake actuator for carrying out a parking braking operation or a resting braking operation. The parking brake actuator can be embodied, for example, in the form of an electromechanical brake which can apply a braking force by means of an electric motor.

The pedal travel simulator 3 is hydraulically coupled to the master brake cylinder 2 and includes essentially a simulator chamber 29, a simulator spring chamber 30 and a simulator piston 31 which separates the two chambers 29, 30 from one another. The simulator piston 31 is supported on the housing 21 by means of an elastic element which is arranged in the simulator spring chamber 30. The simulator chamber 29 can be connected to the first pressure space 17 of the tandem master brake cylinder 2 by means of an electrically actuatable simulator enabling valve 32. When a pedal force is predefined and the simulator enabling valve 32 is activated, pressure medium flows from the master brake cylinder pressure space 17 into the simulator chamber 29. A nonreturn valve 34 which is arranged hydraulically antiparallel with respect to the simulator enabling valve 32 permits largely unimpeded flowing back of the pressure medium from the simulator chamber 29 to the master brake cylinder chamber 17 irrespective of the switched state of the simulator enabling valve 32.

The electrically controllable pressure supply device 5 is embodied as a hydraulic cylinder-piston arrangement whose piston 51 can be actuated by a schematically indicated electric motor 35 with the intermediate connection of a rotational-translational gear mechanism (for example a ball screw drive) 36, which is also illustrated schematically. The pressure supply device 5 is formed according to the example by a stepped bore 54 which is arranged in the housing 21 and in which the piston 51, which is embodied in a stepped fashion, is movably guided. The piston 51 bounds, with the housing 21, a pressure space 50 which is sealed with respect to atmospheric pressure by means of a main sealing element 60. It is possible for pressure medium to be drawn on into the pressure space 50 as a result of the piston 51 moving back when the sequence valves 26a, 26b are closed, since pressure medium can flow into the pressure space 50 from the pressure medium reservoir vessel 4 via a feed valve 52 which takes the form of a nonreturn valve which opens in the direction of flow to the actuator. A pressure medium connection 62 for connecting to the system pressure line 38 and therefore for connecting to the wheel brakes 8a-8d is provided at the pressure space 50.

The pressure supply device 5 includes an additional sealing element 61 by which the pressure space 50 is additionally sealed (in the region of the pressure medium connection 62) after a predefined actuation of the piston 51. Given sufficient actuation of the piston 51, the pressure space 50 is divided into a first pressure space area 50', in the region of which the pressure medium connection 62 is arranged, and a second pressure space area 50" (an annular chamber). The pressure space areas 50', 50" are then hydraulically disconnected from one another by means of the additional sealing element 61 which is arranged at the smaller piston step 51'. A connection, via which the second pressure space area 50" is connected to an electrically actuatable valve 57, which is closed in the currentless state (NC) and which is also connected to the pressure medium reservoir vessel 4 via line 41c, is provided in the pressure space area 50".

The additional sealing element 61 is arranged, for example, on the piston 51 (in the region 51' of the smaller step/). The journal/journal piston part 51' with the additional sealing element 61 can dip into the smaller bore (in pressure space 50').

Alternatively, the additional sealing element 61 can be arranged in the region of the smaller bore (i.e. in the pressure space area 50'). The journal/journal piston part 51' can dip into the sealing element 61.

An advantage of the two-step pressure supply device 5 is that in the event of a leak in the region of the second pressure space area 50" or of the main sealing element 60 the pressure buildup at the wheel brakes 8a-8d can still be carried out via the pressure space 50 (specifically the pressure space area 50').

Figure 3:
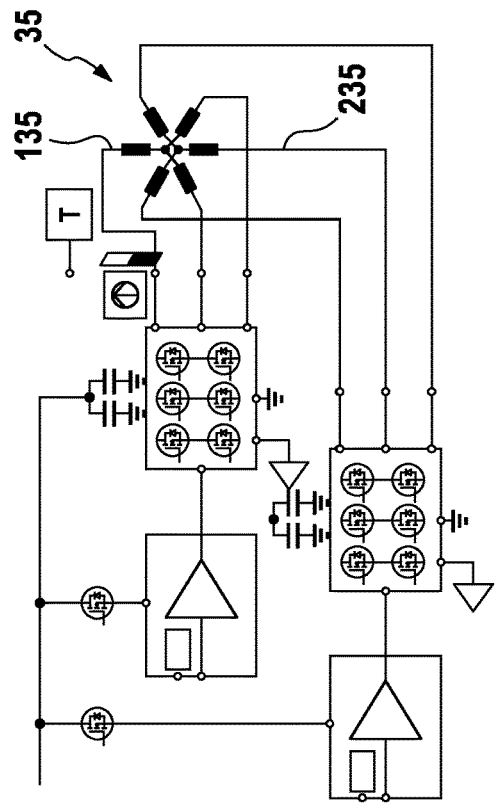
FIG. 3 shows an exemplary activation arrangement for an exemplary electric motor of a pressure supply device.
Figure 3:
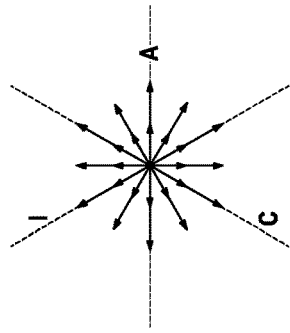
Figure 3:
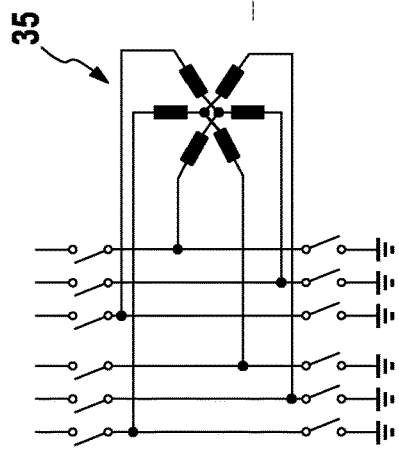

The electric motor 35 includes a rotor and a stator (not illustrated in FIG. 1) and is embodied, for example, as a brushless DC motor which has two drive units which can be operated independently of one another and which each have a winding 135, 235 for driving the rotor of the electrical motor. Each drive unit is suitable per se for applying a torque to the rotor and therefore maintaining the function of the electric motor. In this way, redundancy of drive units is provided within the electric motor means that in the event of a failure of a drive unit sufficient torque can be generated with the other drive unit. FIG. 3 shows an exemplary arrangement of the activation of the electric motor 35 with doubled windings 135, 235 and the pointer diagram thereof.

In order to detect a characteristic variable for the position of the piston 51 of the pressure supply device 5, a sensor 44 is provided which is embodied, for example, as a rotor position sensor which serves to detect the rotor position of the electric motor 35. Other sensors are also conceivable, for example a travel sensor for detecting the position of the piston 51. The pressure medium volume which is output or taken up by the pressure supply device 5 can be determined on the basis of the variable which is characteristic of the position of the piston 51.

In order to detect the brake system pressure generated by the pressure supply device 5, a pressure sensor 19 which is preferably a redundantly embodied pressure sensor 19 is provided.

The single electronic open-loop and closed-loop control unit (ECU) 12 of the brake system serves to activate the pressure supply device 5, the isolating valves 23a, 23b, the sequence valves 26a, 26b, the simulator enabling valve 32, the diagnostic valve 28 and the inlet and outlet valves 6a-6d, 7a-7d.

FIG. 2 shows a first exemplary open-loop and closed-loop control unit of a brake actuation unit according to the invention. The exemplary architecture of the open-loop and closed-loop control unit 12 includes a first microcontroller (MCU 1) 201 with a multi-core operating system (multicore OS) 204 and a second microcontroller (MCU 2) 301 with a multicore operating system (MultiCore OS) 304.

A microcontroller in the sense of this description is also understood to refer to microprocessors, microcontroller systems and microprocessor systems which can have at least one processor and can detect and output signals by means of peripheral functions.

The first microcontroller 201 is designed to carry out software functions 202 which are known per se and which relate to the electronic brake system (EBS SW) such as brake slip control function (ABS: anti-lock brake system), vehicle movement dynamics control system (ESC: electronic stability control), traction control function (TCS: traction control system) etc. as well as by-wire specific software functions 203 (by-wire SW) such as, for example, for activating the pressure supply device 5. The software functions 202 relate essentially to the activation of the inlet and outlet valves 6a-6d, 7a-7d, while the software functions 203 relate essentially to the activation of the electric motor 35 and of the isolating and sequence valves 23a, 23b, 26a, 26b as well as the simulator enabling valve 32.

The second microcontroller 301 is designed, for example, to carry out software functions 302 which relate to the activation of a parking brake actuator (IPB (Integrated Parking Brake)) (IPB SW), as well as by-wire specific software functions 303 (by-wire SW extract). In this context, the software functions 302 which can be implemented by means of the second microcontroller 301 can be identical (completely redundant) to the software functions 202 which can be implemented by means of the first microcontroller 201, or the software functions 302 includes only a certain number of basic by-wire functions compared to the software functions 202. In the event of a fault of the first microcontroller 201, at least basic braking can therefore be carried out in the brake-by-wire operating mode by means of the pressure supply device 5 by means of the by-wire specific software functions 303.

Optionally, the software functions 302 of the second microcontroller 301 also include functions (ADM domain) which relate to the activating of further components which are necessary for autonomous driving (autonomous driving AD), for example the steering system. The software for the autonomous driving system is advantageously completely integrated into the microcontroller 301 (software functions 302) of the open-loop and closed-loop control unit 12 of the brake system.

The supply of the open-loop and closed-loop control unit 12 with electrical energy is preferably embodied redundantly. All the electrical components of the open-loop and closed-loop control unit 12 can be supplied with electrical energy from a first electrical energy supply device (energy source) 215 or a second electrical energy supply device (energy source) 216.

For example, the open-loop and closed-loop control unit 12 includes a first electrical connecting element 208, which is also referred to as a system connection (system plug, system connector), and a second electrical connecting element 218, which is also referred to as a power plug (power connector).

For example the open-loop and closed-loop control unit 12 can be connected to the first energy source 215 via the first connecting element 208, and to the second energy source 216 via the second connecting element 218.

A switchover device 217, with which the open-loop and closed-loop control unit 12 is optionally supplied from the first or second energy source, is advantageously provided.

For example, the signals of the master brake cylinder pressure sensor 20 are fed only to the microcontroller 201 via a connection 209, while the signals of the pressure sensor 20 of the pressure supply device 5 are fed only to the microcontroller 301 via a connection 309.

For example, the two redundant signals of the travel sensor 25 for detecting the brake pedal actuation are each fed to one of the microcontrollers 201, 301, i.e. one signal is made available to the microcontroller 201 via the line 210, and the other signal to the microcontroller 301 via the line 210'.

Therefore, there is a high probability that a pressure signal and a travel signal of the master brake cylinder for the activation of the pressure supply device 5 is available to at least one of the two microcontrollers 201, 301.

In order to connect the open-loop and closed-loop control unit 12 of the brake system to the further vehicle control units, for example the microcontroller 201 is connected to a first databus 212 (for example a FLEXRAY® bus) and the microcontroller 301 is connected to a second databus 213 (for example a CAN bus). Other bus systems, for example two CAN buses, are also conceivable.

According to the first exemplary embodiment of the open-loop and closed-loop control unit 12, the first and second databuses 212, 213 are connected to the open-loop and closed-loop control unit 12 via the first connecting element 208.

The microcontrollers 201 and 301 are advantageously connected to one another via a third databus 400. It is therefore possible to exchange information, for example pressure values of the pressure sensors, directly.

As already explained above, the electric motor 35 includes two drive units which can be operated independently of one another and which each have a winding. In order to activate the electric motor 35, the microcontroller 201 includes means (motor control A) 205 for activating one of the drive units of the electric motor 35, and the microcontroller 301 includes means (motor control B) 305 for activating the other drive unit of the electric motor 35. In the event of a failure of the drive unit which is activated by the microcontroller 201, a buildup of pressure by the pressure supply device 5 continues to be possible by means of the motor controller 305 of the second microcontroller 301.

So that the pressure which is made available by the pressure supply device 5 can also be passed on to the wheel brakes 8a-8d, the first microcontroller 201 includes means 207 (valve controller for normal braking, NBrakeValveControl), and the second microcontroller 301 includes means 307 (valve controller for normal braking, NBrakeValveControl) for activating the isolating valves and sequence valves 23a, 23b, 26a, 26b, by means of which the wheel brakes are optionally connected to the master brake cylinder or to the pressure supply device.

The simulator enabling valve 32 can advantageously also be activated by the valve controllers 207 and 307 of the first and second microcontrollers 201, 301.

The diagnostic valve 28 can be activated at least by the valve controller 207 of the first microcontroller 201; it can optionally be embodied such that it can be activated by the valve controller 307.

Figure 4:
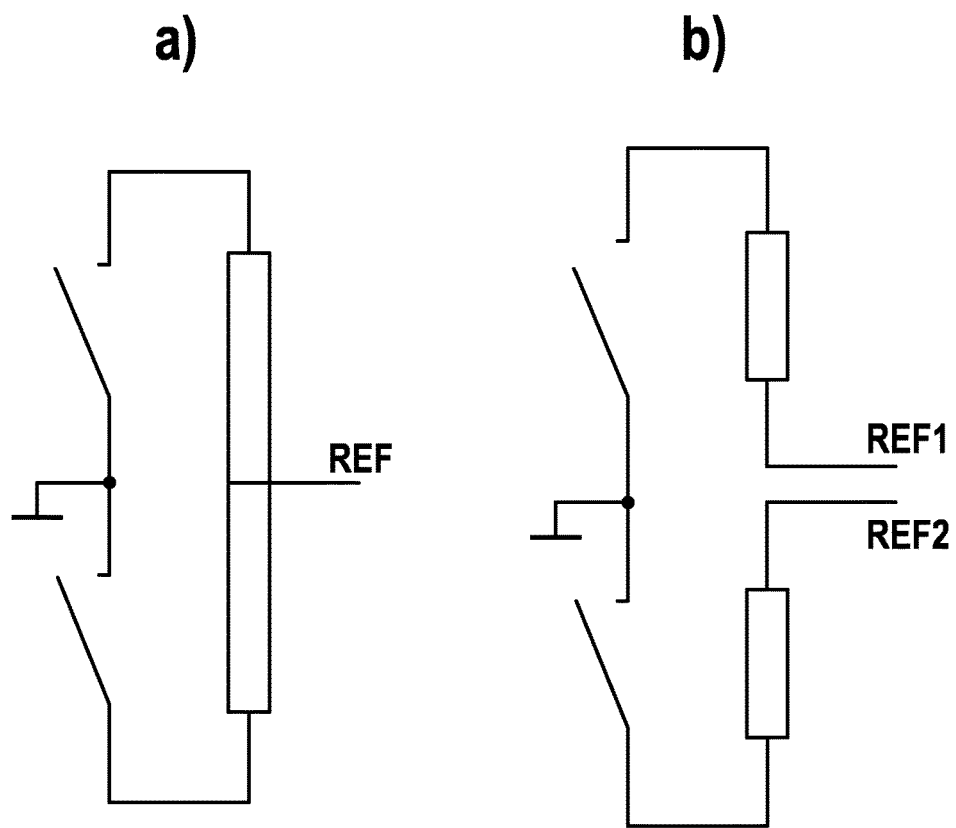
FIG. 4 shows schematic variants of a coil with two turns.

So that a valve can be actuated independently of the microcontrollers 201 and 301, the valve coil includes two turns. FIG. 4 is a schematic illustration of two circuit variants of a coil with two turns, wherein FIG. 4a) shows an economy circuit, and FIG. 4b) shows two electrically isolated windings.

For example, only the first microcontroller 201 includes means 206 (valve controller for the electronic brake system; EBS valve control) for actuating the inlet and outlet valves 6a-6d, 7a-7d of the brake actuation unit 1.

Alternatively, it is advantageous that the inlet and outlet valves 6b, 6d, 7b, 7d of the rear wheel brakes 8b, 8c can be additionally activated by the valve controller 307 of the second microcontroller 301. In the event of failure of the microcontroller 201 it is therefore also possible to carry out electronic braking force distribution by means of a pressure regulator at the rear wheel brakes.

In order to assist service braking which is controlled by the second microcontroller 301, the microcontroller 301 includes, for example, means 306 (IPB actuators) for activating at least one electrically actuatable parking brake actuator (IPB: Integrated Parking Brake). In the case of a brake system with parking brake actuators which are arranged on the wheel brakes 8b, 8d of the rear wheels, said parking brake actuators are actuated in an emergency by means of the activation 306 by the microcontroller 301.

For example, a first power control unit 211, which includes, for example, a fault detection logic (failsafe logic) for the microcontroller 201 and valve driver stages for the inlet and outlet valves 6a-6d, 7a-7d, the isolating and sequence valves 23a, 23b, 26a, 26b, the simulator enabling valve 32 and the diagnostic valve 28 is assigned to the microcontroller 201. Correspondingly, the microcontroller 301 is connected to a second power control unit 311, wherein the latter includes, for example in addition to a fault detection logic (failsafe logic) for the microcontroller 301, valve driver stages only for the isolating and sequence valves 23a, 23b, 26a, 26b, the simulator enabling valve 32 and optionally the diagnostic valve 28. For example the signals of the wheel speed sensors WSS (wheel speed sensor) of all the wheels of the motor vehicle are fed to the first power control unit 211. The signals of all the wheels speed sensors are therefore made available to the first microcontroller 201 (connections 214). Optionally, the signals of the wheel speed sensors of the rear wheels are fed to the second microcontroller 301 (connection 314).

Figure 5:
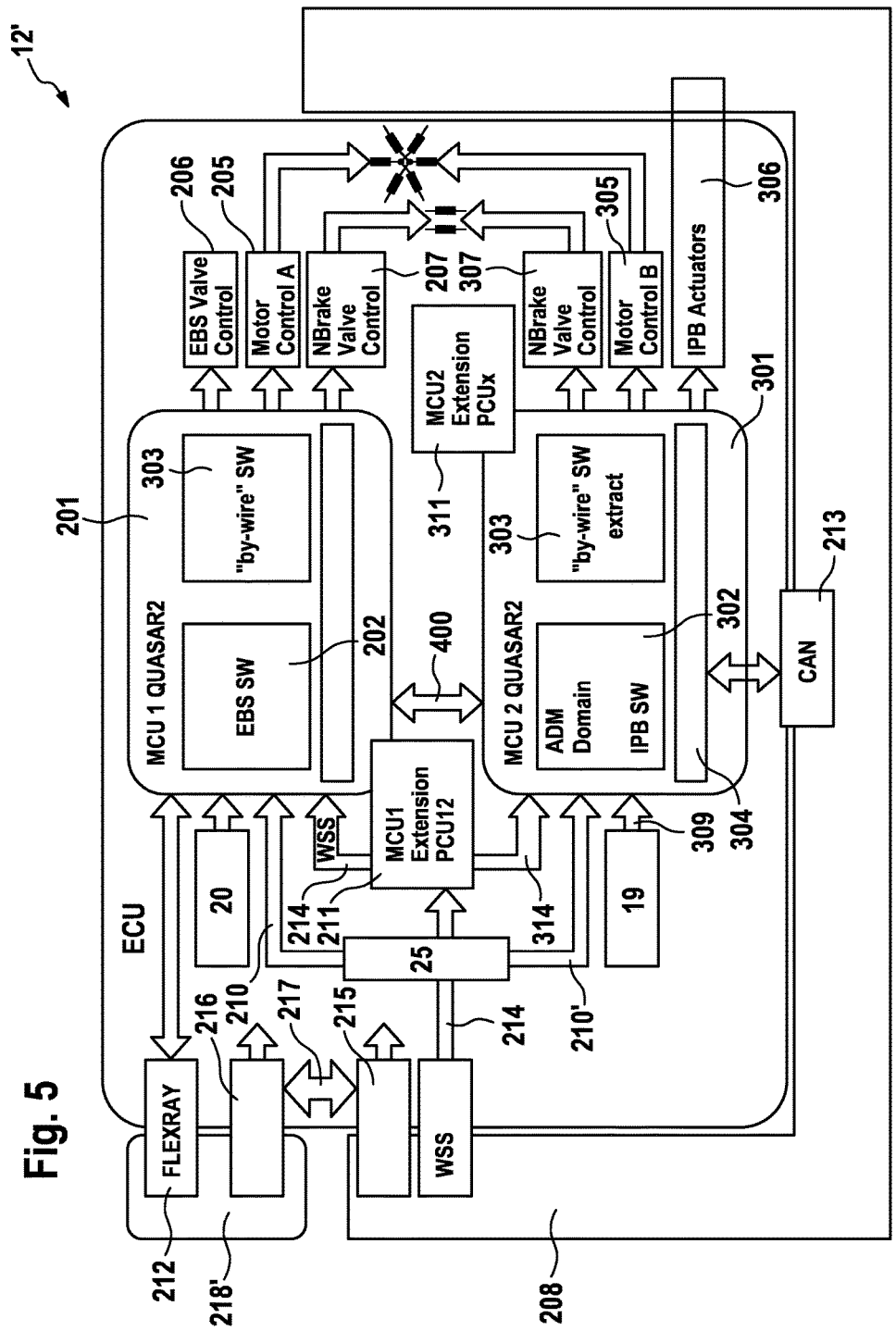
FIG. 5 shows a second exemplary open-loop and closed-loop control unit.

FIG. 5 shows a second exemplary open-loop and closed-loop control unit 12' of a brake actuation unit according to the invention. The architecture of the open-loop and closed-loop control unit 12' corresponds essentially to that of the first exemplary embodiment in FIG. 2. Components which correspond to one another are provided with the same reference symbols. The microcontroller 201 is also connected here to the first databus 212 (for example a FLEXRAY® bus), and the microcontroller 301 is connected to the second databus 213 (for example a CAN bus). In contrast to the exemplary embodiment in FIG. 2, the databuses 212, 213 are connected to the open-loop and closed-loop control unit 12' via various connecting elements 218', 208. For example, the first databus 212 is connected via the second connecting element 218' (power plug), and the second databus 213 via the first connecting element 208 (system plug), to the open-loop and closed-loop control unit 12.

The architecture of the open-loop and closed-loop control unit 12 or 12' includes a dual processor system 201, 301 in which each component system of the architecture 201, 205, 206, 207; 301, 305, 306, 307 can carry out autonomous braking. For this purpose, the valve circuits (see FIG. 4) and activation processes (207, 307) as well as motor windings (135, 235) or motor activation processes (205, 206) of the electric motor 35, which are all necessary for normal braking, are preferably embodied redundantly.

The pressure supply device 5 is embodied in a two-stage fashion, with the result that in the event of a failure of the main seal 60 the additional seal 61 of the second step can still be used. To permit this, the piston 51 moves forward, in the event of damage, until the additional seal 61 becomes effective and a pressure buildup at the wheel brakes can be ensured. A sleeping fault in this seal can be detected by check routines.

Availability of the autonomous pressure buildup in the wheel brakes which is sufficient for autonomous driving is achieved the redundant motor activation means 205, 206, which contains two independent motor windings 135, 235 and associated redundant activation means (205, 305), logic circuits, communication channels and sensor signal evaluation means (203, 303) with the necessary redundant valve circuits.

While the above description constitutes the preferred embodiment of the present invention, it will be appreciated that the invention is susceptible to modification, variation and change without departing from the proper scope and fair meaning of the accompanying claims.

The invention claimed is:

1. A brake actuation unit for a brake-by-wire motor vehicle brake system for a motor vehicle comprising:
   a brake-pedal-actuatable master brake cylinder having at least one master brake cylinder pressure space to which hydraulically actuatable wheel brakes of the motor vehicle can be connected, a pressure medium reservoir vessel which is assigned to the master brake cylinder,
   an electrically controllable pressure supply device which is formed by a hydraulic cylinder-piston arrangement having a piston actuated by an electric motor, wherein the piston bounds a pressure space which is sealed with respect to the atmosphere by a first sealing element and which has a pressure medium connection for connecting to the wheel brakes, a first group of electrically actuatable valves for setting wheel-specific brake pressures,
   a second group of electrically actuatable valves configured to disconnect or connect the wheel brakes from or to the master brake cylinder or from or to the pressure supply device, wherein the second group of valves comprise at least one isolating valve configured to disconnect the master brake cylinder from the wheel brakes of the first and second brake circuits and a sequence valve configured to disconnect the pressure supply device from the wheel brakes of the first or second brake circuit, the sequence valve being a shutoff valve;
   an electronic control unit for activating the electric motor of the pressure supply device, the first group of valves, and the second group of valves,
   the hydraulic cylinder-piston arrangement configured such that after a predefined actuation displacement of the piston the pressure space bounded by the piston is sealed by a second sealing element, in that the electric motor has at least a first and a second drive unit which can be operated independently of one another and each have at least one winding for driving the electric motor, and
   in that the electronic control unit comprises a first microcontroller and a second microcontroller, wherein the first microcontroller is designed to activate the first drive unit of the electric motor, and the second microcontroller is designed to activate the second drive unit of the electric motor, and wherein the first and second microcontrollers are designed to activate the second group of valves.

2. The brake actuation unit as claimed in claim 1, wherein the brake actuation unit further comprises a pedal travel simulator which gives a vehicle driver a brake pedal sensation in a brake-by-wire operating mode and which is embodied so as to be capable of being switched on and off by a simulator enabling valve, wherein the simulator enabling valve can also be activated by the first and the second microcontrollers.

3. The brake actuation unit as claimed in claim 1:
   wherein the pressure supply device further comprises a stepped bore arranged in the housing, the stepped bore having a larger diameter portion and a smaller diameter portion, and
   the piston is embodied as a stepped piston having a piston step with a smaller diameter and a piston step with a larger diameter, the piston step with the smaller diameter is configured to move from the larger diameter portion of the stepped bore to the smaller diameter portion of the stepped bore after the predefined actuation displacement of the stepped piston, and
   wherein the movement of the piston step with the smaller diameter from the larger diameter portion of the stepped bore to the smaller diameter portion of the stepped bore divides the pressure space into a first pressure space area at which the pressure medium connection is arranged, and a second pressure space area in the form of an annular chamber.

4. The brake actuation unit as claimed in claim 3, further comprising:
   in that in a state of the piston displaced beyond the predetermined actuation displacement, and
   the piston step, the first pressure space area, and the second pressure space area are sealed with respect to one another by an additional sealing element.

5. The brake actuation unit as claimed in claim 1 further comprising in that the first group of valves can be activated only by the first microcontroller, wherein the first group of valves comprises one inlet valve and one outlet valve for each of the wheel brakes.

6. The brake actuation unit as claimed in claim 5, further comprising in that only the valves of the first group, assigned to the rear wheel brakes, can be additionally activated by the second microcontroller.

7. The brake actuation unit as claimed in claim 1 wherein the brake actuation unit further comprises an electrically actuatable diagnostic valve which is arranged in a hydraulic connection between the at least one master brake cylinder pressure space and the pressure medium reservoir vessel, wherein the diagnostic valve can be activated by at least the first microcontroller.

8. The brake actuation unit as claimed in claim 1 further comprising in that an electrically actuatable parking brake actuator on at least one of the wheel brakes which are arranged on the wheel brakes of the rear axle of the motor vehicle can be activated only by the second microcontroller.

9. The brake actuation unit as claimed in claim 1 further comprising in that the wheel brakes are arranged in first and second brake circuits.

10. The brake actuation unit as claimed in claim 1 further comprising in that the control unit is an open-loop and closed-loop control unit comprises a first and a second electrical connecting element, wherein the open-loop and closed-loop control unit can be supplied with electrical energy from at least a first electrical energy supply device via the first connecting element, and from at least a second electrical energy supply device via the second connecting element.

11. The brake actuation unit as claimed in claim 1 further comprising in that said brake actuation unit has a first pressure sensor for detecting a pressure of the master brake cylinder, and a second pressure sensor for detecting a pressure of the pressure supply device, wherein signals of the first pressure sensor are fed only to the first microcontroller, and signals of the second pressure sensor are fed only to the second microcontroller.

12. The brake actuation unit as claimed in claim 1 wherein the brake actuation unit further comprises a redundantly embodied travel sensor or two travel sensors for detecting a position of a brake pedal or of a master brake cylinder piston, wherein at least one signal of the travel sensor or the travel sensors is fed to the first and the second microcontrollers.

13. The brake actuation unit as claimed in claim 1 further comprising in that a first bus connection for a first databus and a second bus connection for a second databus are provided, wherein the first bus connection is connected only to the first microcontroller, and the second bus connection is connected only to the second microcontroller, and in that the first and the second microcontrollers are connected to one another via a third databus.

14. The brake actuation unit as claimed in claim 13, further comprising in that the first bus connection and the second bus connection are arranged on different electrical connecting elements.

* * * * *